US006507792B1

(12) United States Patent
Senoo et al.

(10) Patent No.: US 6,507,792 B1
(45) Date of Patent: Jan. 14, 2003

(54) METHOD OF SELECTING DEVICES FOR USE IN FLUID PIPELINE NETWORK

(75) Inventors: Mitsuru Senoo, Yawara-mura (JP); Huping Zhang, Yawara-mura (JP); Naotake Oneyama, Yawara-mura (JP)

(73) Assignee: SMC Corporation, Tokyo (JP)

( * ) Notice: Subject to any disclaimer, the term of this patent is extended or adjusted under 35 U.S.C. 154(b) by 84 days.

(21) Appl. No.: 09/656,792

(22) Filed: Sep. 7, 2000

(30) Foreign Application Priority Data

Oct. 14, 1999 (JP) .......................................... 11-292245

(51) Int. Cl.[7] .......................... G01M 3/08; G05D 11/00

(52) U.S. Cl. ........................ 702/50; 73/40.5 R; 310/86; 417/26; 700/283

(58) Field of Search ............................. 702/12, 45, 50, 702/51, 114; 417/26; 73/40, 40.5 A, 40.5 R, 592; 310/86; 700/3, 9, 17, 262, 283

(56) References Cited

U.S. PATENT DOCUMENTS 4,119,391 A * 10/1978 Rutshtein et al. ............. 417/26
4,200,911 A * 4/1980 Matsumoto .................. 700/28
4,888,706 A * 12/1989 Rush et al. ................. 700/283
5,708,195 A * 1/1998 Kurisu et al. ............ 73/40.5 R
5,940,290 A * 8/1999 Dixon ........................... 700/9
6,011,334 A * 1/2000 Roland ......................... 310/86
6,203,631 B1 * 3/2001 Bowen et al. .............. 148/336
6,282,463 B1 * 8/2001 Oneyama et al. ........... 700/262

OTHER PUBLICATIONS

Japanese Periodical (identity unknown), vol. 50, No. 3, 1998 (pp. 81–84).

Kiuchi, T., "Calculation of Steady–State Flows in Pipeline Networks by Means of Node Admittance Matrix," *Transactions of the Japan Society of Mechanical Engineers*, (Edition B), vol. 57, No. 540 (Aug. 1991).

* cited by examiner

*Primary Examiner*—John S. Hilten
*Assistant Examiner*—John Le
(74) *Attorney, Agent, or Firm*—Baker Botts L.L.P.

(57) ABSTRACT

A method of selecting devices for use in a fluid pipeline network, wherein items of data concerning devices are stored in a pipe database, a pipe joint database and a valve database, and calculating equations for use in computation are also stored. Devices are temporarily selected by using the stored device data, and then computation is performed by using the stored calculating equations, thereby allowing device selection to be made easily. In addition, a block diagram of the fluid pipeline network can be made easily.

5 Claims, 4 Drawing Sheets

FLOW OF FLUID PIPELINE NETWORK DEVICE SELECTING METHOD

FLOW OF FLUID PIPELINE NETWORK DEVICE SELECTING METHOD

FIG.4

$$Q_L = A \cdot Q \quad (1)$$

$$Q = Y \cdot A^T \cdot P \quad (2)$$

$$Q_L = A \cdot Y \cdot A^T \cdot P = Y_N \cdot P \quad (3)$$

$$Y_N = A \cdot Y \cdot A^T \quad (4)$$

$$Q = Y(P_1 - P_2) \quad (5)$$

$$Y = \pi^2 D^{5.31} P / 8fL \rho P_0 Q \quad (6)$$

$$Y = 1/\{f(L/D^5)(8/\pi^2 g)\rho g Q\} \quad (7)$$

FIG.5

Q:FLOW RATE

SUPERSCRIPT T:TRANSPOSITION SYMBOL

P:PRESSURE
($P_0$:ATMOSPHERIC PRESSURE)

Y:ADMITTANCE

K:FLOW COEFFICIENT

D:PIPE INNER DIAMETER

L:PIPE LENGTH

S:SPECIFIC GRAVITY

B:SOUND VELOCITY f:PIPE FRICTION FACTOR g:GRAVITATIONAL ACCELERATION $\rho$:DENSITY

QL:NODE FLOW LOAD VECTOR

Q:BRANCH FLOW VECTOR

A:INPUT-OUTPUT MATRIX

METHOD OF SELECTING DEVICES FOR USE IN FLUID PIPELINE NETWORK

BACKGROUND OF THE INVENTION

The present invention relates to a method of selecting devices for use in a fluid pipeline network, e.g. a pneumatic pipeline network or a coolant pipeline network, for supplying compressed air, cooling water, etc. to various machining devices or the like.

To select pipes, pipe joints and valves (stop valves) for use in a fluid pipeline network, first, a block diagram of the fluid pipeline network is made. In the block diagram, user-specified data items, such as the length of each section, the pressure and flow rate at a fluid source, and the flow rate at each of inlet and outlet portions, are entered. The designer temporarily selects sizes of pipes, pipe joints and valves by intuition. Then, the designer forms equations representing the flow rate at each branch point (junction point) in the fluid pipeline network and also forms equations representing the pressure and flow rate in each section. These equations are solved as simultaneous equations to obtain a pressure drop and flow rate in each section of the fluid pipeline network, and differences between the user's desired values and the calculated values are obtained. In view of the differences, the sizes of the devices are changed, and a calculation similar to the above is performed. The calculation and the change in size of the devices are repeated to select devices that meet the user's demand. The above-described selection method is described in "The Energy Conservation" Vol. 50, No. 3, pp. 81–84, published in March, 1998, by The Energy Conservation Center Japan.

According to the conventional technique, a block diagram of a fluid pipeline network is drawn on a sheet of paper, and input conditions are entered in the block diagram. Devices to be used are temporarily selected, and a pressure drop and flow rate in the fluid pipeline network are calculated by an appropriate method. The temporary selection of devices and the calculation are repeated many times until the calculated pressure drop and flow rate reach the desired values. Therefore, much labor is required to select optimum devices.

The present invention is applied to a method of selecting devices for use in a fluid pipeline network, wherein a circuit configuration of the fluid pipeline network is made by connecting together sections between a fluid source, inlet portions, branch points and outlet portions with section devices, and a pressure at the fluid source and a flow rate at each outlet portion are given. Then, the pressure loss in each section between the fluid source and an inlet or outlet portion is adjusted to the desired value of allowable pressure loss. According to the present invention, items of data concerning devices (pipes, pipe joints and valves) are stored in databases for the various devices, and calculating equations for use in computation are also stored. Section devices are selected from the databases for the various devices, and pressures at branch points and outlet portions are computed with respect to the fluid pipeline network for which the section devices have been selected, by using the stored calculating equations.

SUMMARY OF THE INVENTION

A first object of the present invention is to provide a method of selecting devices for use in a fluid pipeline network, wherein items of data concerning devices and calculating equations for use in computation are stored in advance, and devices are temporarily selected by using the stored device data, and then computation is performed by using the stored calculating equations, thereby allowing device selection to be made easily. A second object of the present invention is to provide a method of selecting devices for use in a fluid pipeline network, wherein node positions and branch positions are displayed on a screen, and inlet portions and outlet portions are selected from the node positions, and further pipeline sections are selected from the branch positions and the node positions, thereby allowing a block diagram of the fluid pipeline network to be made easily.

The present invention is applied to a method of selecting devices for use in a fluid pipeline network, wherein a circuit configuration of the fluid pipeline network is made by connecting together sections between a fluid source, inlet portions, branch points (including junction points) and outlet portions with section devices, and a pressure at the fluid source and a flow rate at each outlet portion are given, and then the pressure loss in each section between the fluid source and an inlet or outlet portion is adjusted to the desired value of allowable pressure loss. According to a first arrangement of the present invention, items of data concerning pipes, pipe joints and valves are stored in a pipe database, a pipe joint database and a valve database, respectively, and calculating equations for use in computation are also stored. Section devices, i.e. pipes, pipe joints and valves, are selected from the pipe database, the pipe joint database and the valve database, respectively, and pressures at the branch points and the outlet portions are computed with respect to the fluid pipeline network for which the section devices have been selected, by using the stored calculating equations.

According to a second arrangement of the present invention, after the entry of the value of allowable pressure loss, the pressure at the fluid source and the flow rate at each of the inlet and outlet portions in the first arrangement, all sections of the fluid pipeline network are subjected to computation using a node analysis method to judge whether or not there is a section that does not satisfy the condition of allowable pressure loss. If there is such a section, an inlet/outlet flow rate change or a section device change is made with respect to the section. Then, a judgment as to whether or not there is a section that does not satisfy the condition of allowable pressure loss is made again by computation using the node analysis method. The inlet/outlet flow rate change or the section device change and the computation are repeated until there is no section that does not satisfy the condition of allowable pressure loss.

According to a third arrangement of the present invention, in the first or second arrangement, node positions and branch positions, which are arranged in a grid pattern, are displayed on a screen, and inlet portions, branch points and outlet portions are selected from the node positions. Further, sections to which section devices are to be connected are selected from the branch positions and the node positions to make a circuit configuration.

According to a fourth arrangement of the present invention, in the second arrangement, node positions and branch positions, which are arranged in a grid pattern, are displayed on a screen, and inlet portions, branch points and outlet portions are selected from the node positions. Further, sections to which section devices are to be connected are selected from the branch positions and the node positions to make a circuit configuration. As a result of the computation using the node analysis method, a pressure is displayed at each branch point, and a pressure and a flow rate are displayed at each of the inlet and outlet portions.

In addition, the present invention is applied to a method of selecting devices for use in a fluid pipeline network, wherein a circuit configuration of the fluid pipeline network is made by connecting together sections between inlet portions, branch points and outlet portions with section devices, and a pressure and a flow rate at each outlet portion are given, and then the pressure loss in each section between an inlet portion and an outlet portion is adjusted to the desired value of allowable pressure loss. According to a fifth arrangement of the present invention, items of data concerning pipes, pipe joints and valves are stored in a pipe database, a pipe joint database and a valve database, respectively, and calculating equations for use in computation are also stored. Section devices, i.e. pipes, pipe joints and valves, are selected from the pipe database, the pipe joint database and the valve database, respectively, and pressures at the branch points and the outlet portions are computed with respect to the fluid pipeline network for which the section devices have been selected, by using the stored calculating equations.

According to a sixth arrangement of the present invention, after the entry of the value of allowable pressure loss, the pressure at each inlet portion and the flow rate at each of the inlet and outlet portions in the fifth arrangement, all sections of the fluid pipeline network are subjected to computation using a node analysis method to judge whether or not there is a section that does not satisfy the condition of allowable pressure loss. If there is such a section, an inlet/outlet flow rate change or a section device change is made with respect to the section. Then, a judgment as to whether or not there is a section that does not satisfy the condition of allowable pressure loss is made again by computation using the node analysis method. The inlet/outlet flow rate change or the section device change and the computation are repeated until there is no section that does not satisfy the condition of allowable pressure loss.

According to a seventh arrangement of the present invention, in the fifth or sixth arrangement, node positions and branch positions, which are arranged in a grid pattern, are displayed on a screen, and inlet portions, branch points and outlet portions are selected from the node positions. Further, sections to which section devices are to be connected are selected from the branch positions and the node positions to make a circuit configuration.

According to an eighth arrangement of the present invention, in the sixth arrangement, node positions and branch positions, which are arranged in a grid pattern, are displayed on a screen, and inlet portions, branch points and outlet portions are selected from the node positions. Further, sections to which section devices are to be connected are selected from the branch positions and the node positions to make a circuit configuration. As a result of the computation using the node analysis method, a pressure is displayed at each branch point, and a pressure and a flow rate are displayed at each of the inlet and outlet portions.

In the method according to the first arrangement of the present invention, items of data concerning devices are stored in the pipe database, the pipe joint database and the valve database, and calculating equations for use in computation are also stored. Devices are temporarily selected by using the stored device data, and then computation is performed by using the stored calculating equations. Therefore, device selection can be made easily.

In the method according to the second arrangement of the present invention, the inlet/outlet flow rate change or the section device change and the computation using the node analysis method are repeated until there is no section that does not satisfy the condition of allowable pressure loss. Therefore, selection of devices desired by the user can be made accurately.

In the method according to the third arrangement of the present invention, node positions and branch positions are displayed on a screen. Inlet portions and outlet portions are selected from the node positions, and pipeline sections are selected from the branch positions and the node positions. Therefore, a block diagram of the fluid pipeline network can be made easily.

In the method according to the fourth arrangement of the present invention, as a result of the computation, a pressure is displayed at each branch point on the screen, and a pressure and a flow rate are displayed at each of the inlet and outlet portions. Therefore, the computational results can be grasped easily.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 4 shows calculating equations for use in the computation (node analysis method) in the embodiment of the present invention.

FIG. 5 shows the meaning of each symbol used in the calculating equations in FIG. 4.

DESCRIPTION OF THE PREFERRED EMBODIMENTS

Figure 1:
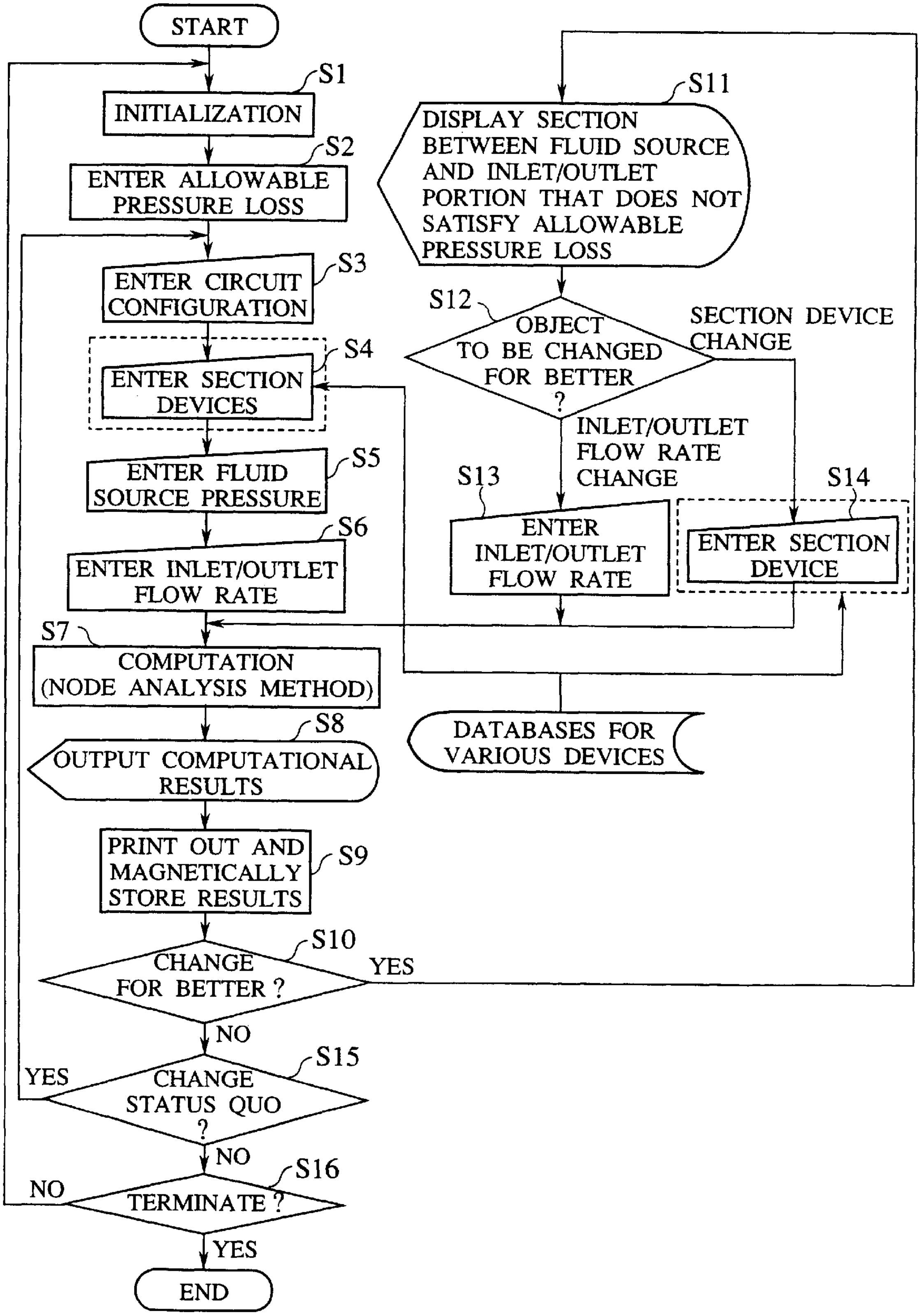
FIG. 1 is a flowchart showing the flow of an embodiment of the method of selecting devices for use in a fluid pipeline network according to the present invention.
Figure 2:
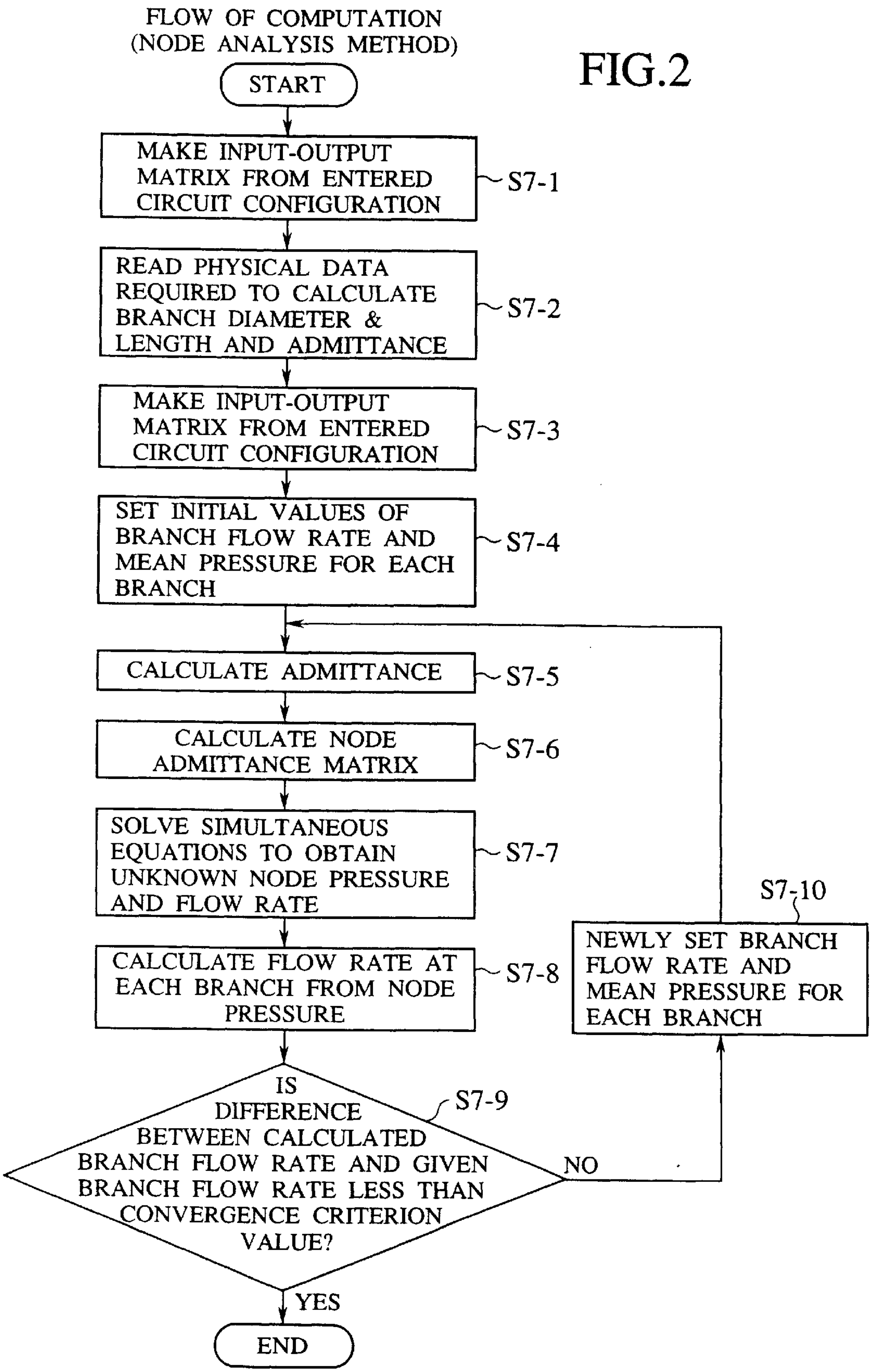
FIG. 2 is a flowchart showing the flow of computation (node analysis method) at step S7 in FIG. 1.
Figure 3:
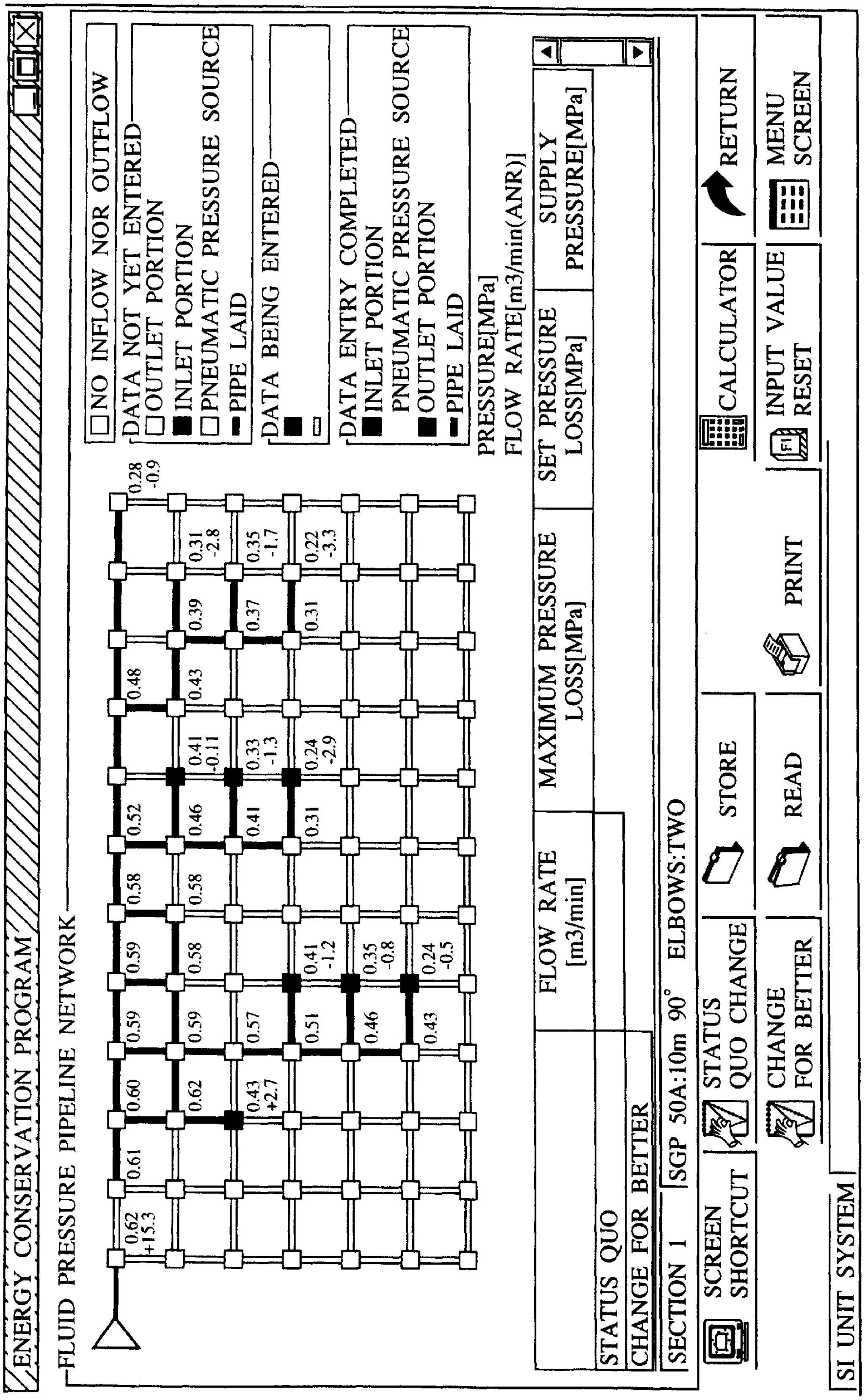
FIG. 3 shows a screen of a personal computer used in the embodiment of the present invention.

FIGS. 1 to 5 show an embodiment of the method of selecting devices for use in a fluid pipeline network according to the present invention. FIG. 1 is a flowchart showing the flow of the embodiment of the present invention. FIG. 2 is a flowchart showing the flow of computation (node analysis method) at step S7 in FIG. 1. Databases for various devices include a pipe database, a pipe joint database and a valve database, in which items of data concerning devices to be selected, i.e. pipes, pipe joints and valves (stop valves), have been stored in advance. Regarding pipes and valves, items of data such as ID numbers, names, inner diameters and pipe friction factors are stored. Regarding pipe joints, data items such as ID numbers, names, pipe connection ID numbers and straight pipe-equivalent lengths are stored. FIG. 3 shows a screen of a personal computer. While looking at the screen, the operator selects devices according to the flows shown in FIGS. 1 and 2.

In the embodiment of the present invention, input conditions given by the user are a circuit configuration, lengths of sections, pipe diameters, flow rates at inlet and outlet portions, and a pressure and flow rate at a fluid source. A desired value given by the user is a value of allowable pressure loss in each section between the fluid source and an inlet or outlet portion.

When the program of the flowchart shown in FIG. 1 is started, initialization is executed at step S1. By the initialization, the program (including calculating equations for use in computation) is read, and display of an input screen, connection with the databases for the various devices, etc. are executed. On the screen shown in FIG. 3, immediately after the initialization, node positions arranged in a grid pattern are shown by white squares, and branch positions between the node positions are shown by double lines. At step S2, a user-specified desired value of allowable pressure loss in each section between the fluid source and an inlet or outlet portion is entered.

At step S3, a circuit configuration of the fluid pipeline network is entered. To enter the circuit configuration, branch positions, which are shown by the double lines in FIG. 3, are sequentially selected and clicked (when clicked, the double lines become black thick lines). Inlet and outlet portions are selected from terminal portions of the circuit (when determined to be an inlet or outlet portion, a node position shown by a white square at a terminal portion changes to a black square). A circuit configuration is made by selection of inlet portions, branch points and outlet portions from the node positions and selection of sections to which section devices are to be connected from the branch and node positions. It should be noted that branch pipes are used at branch points, and series pipes and pipe joints are used at node positions that form intermediate portions of sections. In this embodiment, the position of a fluid source is designated next to the upper left-end node position on the left.

The sections between the inlet portions, branch points and outlet portions selected at step S3 are displayed as branches between the nodes that are shown by black thick lines. The length of each section is the sum of the length of pipe, the lengths of pipe joints (including node pipe joints) and the straight pipe-equivalent lengths of valves. At step S4, the length of pipe, the number of pipe joints and the number of valves are entered, and the diameter of pipe, the type of pipe joint and the type of valve are entered by being selected from the databases for the various devices. It should be noted that the diameter and length of pipe and the types and numbers of pipe joints and valves are temporarily selected by taking into account the user's desired input conditions. At step S5, the value of supply pressure of the fluid source is entered (in a pneumatic pipeline network, the fluid source pressure is generally 0.4 to 0.8 MPa; in a coolant pipeline network, it is generally 0.05 to 2 MPa).

In the case of general fluid pipeline networks other than coolant pipeline networks, e.g. in a pneumatic pipeline network, the flow rate value at each of the inlet and outlet portions (black squares) is entered at step S6. In the case of a coolant pipeline network, the nozzle diameter, the number of nozzles and the opening pressure are entered in place of the flow rate value at each outlet portion on the assumption that a coolant (cooling water) is jetted out from nozzles at the outlet portion. At step S7, a flow rate value is calculated from the nozzle diameter, the number of nozzles and the opening pressure. With this flow rate value, the process is carried out in the same way as in a case where the flow rate value at the outlet portion was entered at step S6.

At step S7 in the flowchart shown in FIG. 1, the pressure at each node of the fluid pipeline network is obtained by the node analysis method on the basis of the entered parameters. The computation using the node analysis method is performed according to the flowchart of FIG. 2. According to the node analysis method, calculating equations (1) to (7) shown in FIG. 4 hold (the meaning of each symbol is as shown in FIG. 5), and these equations are stored in advance. It should be noted that equation (3) is derived from equations (1) and (2). Equation (6) represents the admittance of the pipeline in a case where a gas is used as a fluid. Equation (7) represents the admittance of the pipeline in a case where a liquid is used as a fluid.

At step S7-1 in FIG. 2, an input-output matrix [A in equation (1) in FIG. 4] is made from the entered circuit configuration. It should be noted that, in the input output matrix, branches and nodes are arranged in rows and columns, respectively, to show whether or not there is a flow at a branch or a node and to indicate the direction of the flow. At step S7-2, physical data required to calculate the branch diameter and length and the admittance of the fluid pipeline network is read. For the branch diameter, data is selected and read from the pipe database. For the branch length, the user-specified section length is read. The density (varying in value according to the kind of fluid) and the gravitational acceleration are prepared in the program in advance.

At step S7-3, an input-output matrix is made from the entered circuit configuration. At step S7-4, initial values of the branch flow rate and mean pressure are set for each branch. It should be noted that the initial value of branch flow rate is an appropriate numerical value other than zero, and the mean pressure (the maximum pressure in the circuit) is also an appropriate numerical value (in a pneumatic pipeline network, 1 $m^3$/min (ANR) is used as the branch flow rate, and the pneumatic source pressure (MPa) is used as the mean pressure).

At step S7-5, admittance is calculated. In a case where a gas is used as a fluid (e.g. a pneumatic pipeline network), admittance is calculated by using equation (6) in FIG. 4. In a case where a liquid is used as a fluid (e.g. a coolant pipeline network), admittance is calculated by using equation (7) in FIG. 4. At step S7-6, the node admittance matrix is calculated by using equation (4) in FIG. 4. At step S7-7, the simultaneous equations (3) are solved to obtain an unknown node pressure and flow rate. It should be noted that the Gaussian elimination previously incorporated in the program is used for this calculation.

At step S7-8, the flow rate at each branch is calculated from the pressure at each node by using equation (5) in FIG. 4. At step S7-9, it is judged whether or not the difference between the branch flow rate obtained by the calculation at step S7-8 and the branch flow rate initially given at step S7-4 is less than a predetermined value of convergence criterion. If YES is the answer at step S7-9, the process proceeds to step S8 in FIG. 1.

If it is judged at step S7-9 that the difference between the calculated branch flow rate and the initially given branch flow rate is not less than the value of convergence criterion, a branch flow rate and mean pressure are newly set for each branch at step S7-10. Then, the process proceeds to step S7-5, and the flow of steps S7-5 to S7-9 is repeated. It should be noted that the mean pressure set at step S7-10 is obtained by calculating a mean value at each branch from the node pressure obtained by solving the simultaneous equations.

At step S8 in FIG. 1, the results of the computation are outputted. In the screen shown in FIG. 3, for example, the pressure at each branch point in the circuit configuration of the fluid pipeline network is displayed on the lower right of the node position representing the branch point, and the pressure and flow rate at each of the inlet and outlet portions are displayed on the lower right of the node position representing the inlet or outlet portion (the pressure being displayed in the upper place, and the flow rate in the lower place). At step S9, the computational results are printed out and also stored on a hard disk (a magnetic recording medium used with the personal computer), a floppy disk (a magnetic recording medium), an MO (a magneto-optic disk), etc.

At step S10, whether or not to make a change for the better is judged. The judgment as to whether or not to make a change for the better is made on the basis of the above-described value of allowable pressure loss. If there is a section that does not satisfy the condition of allowable pressure loss among the sections between the fluid source and the inlet or outlet portions in the fluid pipeline network, it is judged that a change for the better should be made. The operator makes the judgment at step S10 while looking at the screen shown in FIG. 3. If it is judged at step S10 that a change for the better should not be made, the process proceeds to step S15.

If it is judged at step S10 that a change for the better should be made, a section that does not satisfy the condition of allowable pressure loss among the sections between the fluid source and the inlet or outlet portions in the fluid pipeline network is displayed at step S11. At step S12, an object to be changed for the better, i.e. either an inlet/outlet flow rate change or a section device change, is chosen with regard to the section not satisfying the condition of allowable pressure loss. Regarding the choice at step S12, if the operator judges that the user-specified conditions will be satisfied if the inlet/outlet flow rate at the present stage is changed, the inlet/outlet flow rate change is chosen. If the operator judges that the section devices should preferably be changed, the section device change is chosen.

If the inlet/outlet flow rate change is chosen at step S12, the process proceeds to step S13, at which, in the case of a fluid pipeline network (e.g. a pneumatic pipeline network) other than coolant pipeline networks, a changed value of the flow rate at the inlet or outlet portion as a terminal portion is entered. Then, the process proceeds to step S7. In the case of a coolant pipeline network, changed values of the nozzle diameter, the number of nozzles and the opening pressure are entered in place of the flow rate value (the flow executed thereafter is the same as in the case of step S5).

If the section device change is chosen at step S12, the process proceeds to step S14, at which changed data items concerning the pipe diameter and length and the types and numbers of pipe joints and valves are entered by being selected from the databases for the various devices. Then, the process proceeds to step S7. The flow from step S7 to step S10 is executed in the same way as in the previous process. The flow from step S10 through steps S11 and S7 to step S10 is repeated until it is judged at step S10 that a change for the better should not be made.

If it is judged at step S10 that a change for the better should not be made, whether or not to change the status quo is judged at step S15. If there is no mistake such as a data entry mistake, it is judged that the status quo should not be changed, and the process proceeds to step S16. If it is noticed that there is a data entry mistake or the like, or if it is necessary to read computational results stored on a magnetic recording medium in a previous selection of devices and to change a part of the read results, it is judged at step S15 that the status quo should be changed, and the process returns to step S3.

At step S16, whether or not to terminate the program is judged. If it is judged that the program should be terminated, the process proceeds to "End". If it is desired to make a device selection for another fluid pipeline network, it is judged at step S16 that the program should not be terminated, and the process returns to step S1. By initialization at step S1, the information used for the previous device selection is cleared, and the display of the screen shown in FIG. 3 is also cleared.

Although in the foregoing embodiment of the present invention the position of a fluid source is designated next to the upper left-end node position on the left in the circuit configuration shown in FIG. 3, the arrangement may be such that a fluid source is connected to an inlet portion as a terminal portion of the circuit and this inlet portion is regarded as a fluid source. In this case, the inlet portion also serves as a fluid source, and the pressure at the inlet portion is entered as the fluid source pressure at step S5. Further, the desired value given by the user in this case is a value of allowable pressure loss in each section between the inlet portion and an outlet portion.

It should be noted that the present invention is not necessarily limited to the foregoing embodiments but can be modified in a variety of ways without departing from the gist of the present invention.

What is claimed is:

1. A method of selecting devices for use in a fluid pipeline network, comprising the steps of:

making a circuit configuration of the fluid pipeline network by connecting together sections between a fluid source, inlet portions, branch points and outlet portions with section devices;

giving a pressure at the fluid source and a flow rate at each outlet portion; and adjusting a pressure loss in each section between the fluid source and an inlet or outlet portion to a desired value of allowable pressure loss;

wherein items of data concerning pipes, pipe joints and valves are stored in a pipe database, a pipe joint data base and a valve database, respectively, and calculating equations for use in computation are also stored, and wherein section devices, comprising said pipes, pipe joints and valves, are selected from the pipe database, the pipe joint database and the valve database, respectively, and pressure at the branch points and the outlet portions are computed with respect to the fluid pipeline network for which the section devices have been selected, by using the stored calculating equations.

2. A method of selecting devices for use in a fluid pipeline network according to claim 1, wherein after entry of the value of allowable pressure loss, the pressure at the fluid source and the flow rate at each of the inlet and outlet portions, all sections of the fluid pipeline network are subjected to computation using a node analysis method to judge whether or not there is a section that does not satisfy a condition of allowable pressure loss, and if there is such a section, an inlet/outlet flow rate change or a section device change is made with respect to said section, and then a judgment as to whether or not there is a section that does not satisfy the condition of allowable pressure loss is made again by computation using the node analysis method wherein the inlet/outlet flow rate change or the section device change and the computation are repeated until there is no section that does not satisfy the condition of allowable pressure loss.

3. A method of selecting devices for use in a fluid pipeline network according to claim 2, wherein node positions and branch positions, which are arranged in a grid pattern, are displayed on a screen, and inlet portions, branch points and outlet portions are selected from the node positions, and further, sections to which section devices are to be connected are selected from the branch positions and the node positions to make a circuit configuration.

4. A method of selecting devices for use in a fluid pipeline network according to claim 2, wherein node positions and branch positions, which are arranged in a grid pattern, are displayed on a screen, and inlet portions, branch points and outlet portions are selected from the node positions, and further, sections to which section devices are to be connected are selected from the branch positions and the node positions to make a circuit configuration, and as a result of the computation using the node analysis method, a pressure is displayed at each branch point, and a pressure and a flow rate are displayed at each of the inlet and outlet portions.

5. A method of selecting devices for use in a fluid pipeline network according to claim 1, wherein node positions and branch positions, which are arranged in a grid pattern, are displayed on a screen, and inlet portions, branch points and outlet portions are selected from the node positions, and further, sections to which section devices are to be connected are selected from the branch positions and the node positions to make a circuit configuration.

* * * * *